(12) United States Patent
Boisvert et al.

(10) Patent No.: US 9,860,463 B2
(45) Date of Patent: ***Jan. 2, 2018

(54) IMAGE SENSOR WITH NOISE REDUCTION

(71) Applicant: InVisage Technologies, Inc., Menlo Park, CA (US)

(72) Inventors: David Michael Boisvert, San Jose, CA (US); Keith Glen Fife, Palo Alto, CA (US)

(73) Assignee: INVISAGE TECHNOLOGIES, INC., Newark, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/345,468

(22) Filed: Nov. 7, 2016

(65) Prior Publication Data

US 2017/0054928 A1   Feb. 23, 2017

Related U.S. Application Data

(63) Continuation of application No. 14/297,502, filed on Jun. 5, 2014, now Pat. No. 9,491,383.

(60) Provisional application No. 61/832,767, filed on Jun. 7, 2013.

(51) Int. Cl.
*H04N 5/363* (2011.01)
*H04N 5/378* (2011.01)

(52) U.S. Cl.
CPC ............. *H04N 5/363* (2013.01); *H04N 5/378* (2013.01)

(58) Field of Classification Search
None
See application file for complete search history.

(56) References Cited

U.S. PATENT DOCUMENTS

| 5,648,660 | A | 7/1997 | Lee et al. |
| 6,317,154 | B2 | 11/2001 | Beiley |
| 6,911,640 | B1* | 6/2005 | Bencuya ............... H04N 5/363 |
| | | | 250/208.1 |
| 9,491,383 | B2* | 11/2016 | Boisvert ............... H04N 5/363 |
| 2004/0119853 | A1 | 6/2004 | Kokubun et al. |
| 2004/0174449 | A1 | 9/2004 | Lee et al. |
| 2010/0140732 | A1 | 6/2010 | Eminoglu et al. |

(Continued)

FOREIGN PATENT DOCUMENTS

| JP | WO 2013021577 A1 * | 2/2013 | ........... H04N 5/3575 |
| TW | 201511560 A | 3/2015 | |
| WO | WO-2014197784 A1 | 12/2014 | |

OTHER PUBLICATIONS

"U.S. Appl. No. 14/297,502, Non Final Office Action dated Nov. 27, 2015.", 19 pgs.

(Continued)

*Primary Examiner* — Timothy J Henn
(74) *Attorney, Agent, or Firm* — D.Kligler IP Services Ltd.

(57) ABSTRACT

Systems and methods are disclosed for reducing reset noise in an image sensor. Voltage on the column read out is sensed during reset. When the voltage reaches a desired threshold level, a voltage is asserted on the column read out line that turns off the reset transistor. Using column circuitry to turn off the reset transistor may be used to reduce noise associated with the reset switch. In example embodiments, a comparator may be included on each column line to determine when the threshold voltage has been reached and to trigger the assertion of the turn off voltage on the column line.

44 Claims, 14 Drawing Sheets

(56) References Cited

U.S. PATENT DOCUMENTS

| | | |
|---|---|---|
| 2011/0049665 A1 | 3/2011 | Goto |
| 2011/0216212 A1 | 9/2011 | Watanabe et al. |
| 2012/0200752 A1 | 8/2012 | Matsunaga et al. |
| 2013/0075593 A1 | 3/2013 | Williams, Jr. |
| 2013/0208157 A1 | 8/2013 | Bechtel et al. |
| 2013/0277536 A1 | 10/2013 | Mizuno et al. |
| 2014/0054466 A1 | 2/2014 | Kurokawa et al. |
| 2014/0131554 A1 | 5/2014 | Ishii et al. |
| 2014/0146211 A1* | 5/2014 | Mori .................... H04N 5/3575 348/308 |
| 2014/0362263 A1 | 12/2014 | Boisvert et al. |
| 2015/0015759 A1 | 1/2015 | Kayahan et al. |
| 2015/0070544 A1 | 3/2015 | Smith et al. |

OTHER PUBLICATIONS

"U.S. Appl. No. 14/297,502, Notice of Allowance dated Jul. 12, 2016.", 6 pgs.

"U.S. Appl. No. 14/297,502, Response filed May 27, 2016 to Non Final Office Action dated Nov. 27, 2015.", 20 pgs.

"International Application Serial No. PCT/US2014/041275, International Preliminary Report on Patentability dated Dec. 17, 2015.", 13 pgs.

"International Application Serial No. PCT/US2014/041275, International Search Report dated Oct. 16, 2014.", 2 pgs.

"International Application Serial No. PCT/US2014/041275, Written Opinion dated Oct. 16, 2014.", 11 pgs.

Pain, B, et al., "Reset Noise Suppression in Two-Dimensional CMOS Photodiode Pixels through Column-based Feedback-Reset", International Electron Devices Meeting, Session 32.5, (Dec. 2002), 1-4.

U.S. Appl. No. 14/815,020 Office action dated Oct. 18, 2017.

\* cited by examiner

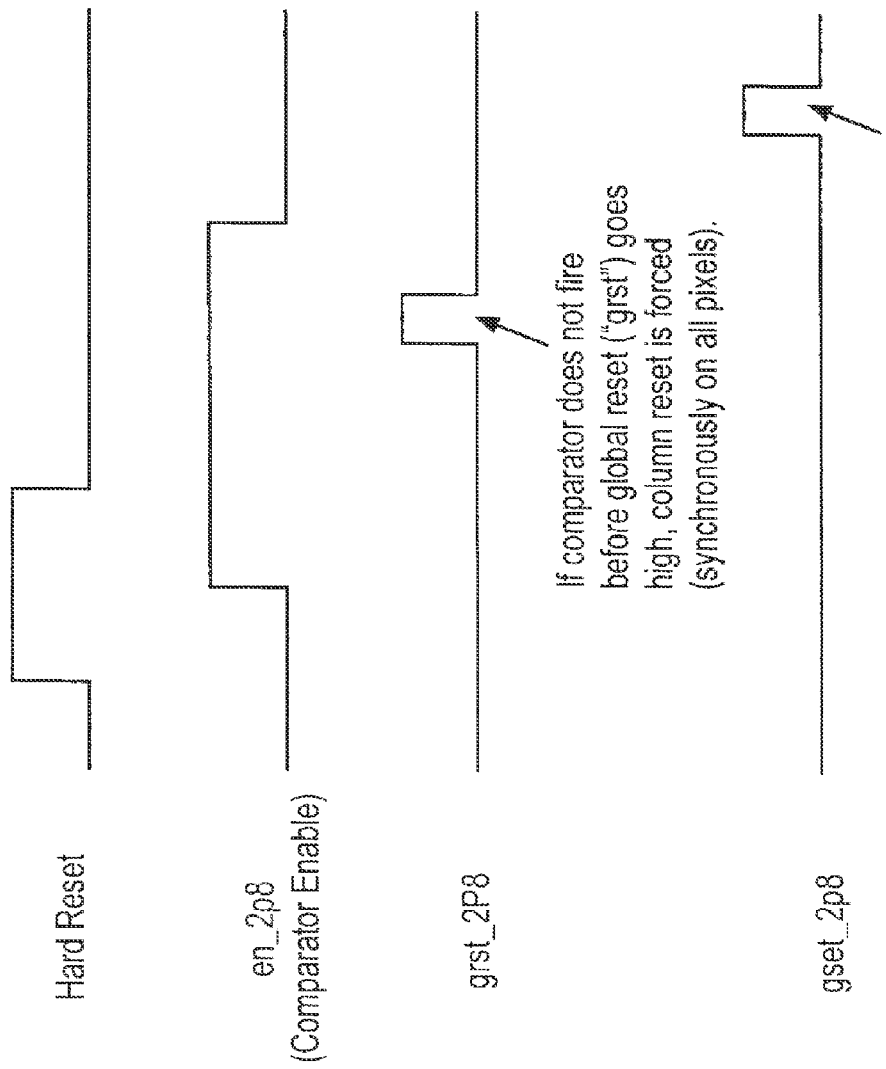

IMAGE SENSOR WITH NOISE REDUCTION

PRIORITY APPLICATIONS

This application claims the benefit of priority to U.S. patent application Ser. No. 14/297,502, filed on Jun. 5, 2014, which claims priority to U.S. Provisional Patent Application No. 61/832,767, filed on Jun. 7, 2013; which applications are incorporated herein by references in their entireties.

BACKGROUND OF THE INVENTION

I. Field

The present invention generally relates to optical and electronic devices, systems and methods that include optically sensitive material, such as nanocrystals or other optically sensitive material, and methods of making and using the devices and systems.

II. Background

In image sensors, maximizing signal-to-noise ratio for a given scene, or lighting level, is desired. One means is to maximize signal, such as by maximizing quantum efficiency of the sensor, and by maximizing its fill factor. Minimizing noise includes a number of components, included in which is minimizing noise associated with the process of resetting the level of the storage node associated with each pixel between each frame interval.

An example of the significance of reset noise, also referred to as kT/C noise, is illustrated in FIG. 1 where a column reset introduces kT/C noise, whose charge can dominate over a photodiode in low light. Thermal noise is electronic noise generated by the thermal agitation of charge carriers, such as electrons, in a circuit. The root-mean-square noise voltage, v, generated in a circuit is:

$$v=\mathrm{sqrt}(kT/C)$$

where k is Boltzmann's constant in Joules per degree Kelvin, and C is the capacitance value in a circuit. In addition to or as an alternative to calculating voltage noise, the reset noise of capacitive sensors (e.g., image sensors) is often a limiting source of noise. The reset noise can be quantified as the electrical charge, Q, standard deviation:

$$Q=\mathrm{sqrt}(kTC)$$

With reference to FIG. 1, if the effective capacitance associated with the charge store is, for example, 2.4 femto-Farads (fF), then the noise associated with resetting of the voltage level can be of order 20 electrons. Especially under low light conditions, this can be a dominant source of noise, since photon shot noise under low light is negligible, and image sensor circuits are designed to minimize all other sources of noise.

INCORPORATION BY REFERENCE

All publications, patents and patent applications mentioned in this specification are herein incorporated by reference to the same extent as if each individual publication, patent, or patent application was specifically and individually indicated to be incorporated by reference.

BRIEF DESCRIPTION OF THE DRAWINGS

A better understanding of the features and advantages of the present invention will be obtained by reference to the following detailed description that sets forth illustrative embodiments, in which the principles of the invention are utilized, and the accompanying drawings.

FIG. 15 is an example of a pixel timing diagram.

DETAILED DESCRIPTION

Figure 1:
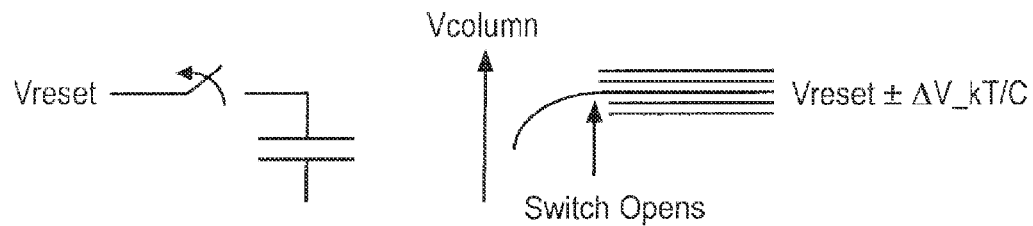
FIG. 1 shows a prior art example of reset noise, also referred to as kT/C noise.

While the present invention is open to various modifications and alternative constructions, the embodiments shown in the drawings will be described herein in detail. It is to be understood, however, there is no intention to limit the invention to the particular forms disclosed. On the contrary, it is intended that the invention cover all modifications, equivalences, and alternative constructions falling within the scope of the invention as expressed in the appended claims.

Embodiments include an image sensor comprising a semiconductor substrate; a plurality of pixel regions, each pixel region comprising an optically sensitive material over the substrate, the optically sensitive material positioned to receive light; a pixel circuit for each pixel region, each pixel circuit comprising a charge store formed on the semiconductor substrate and a read out circuit; and a contact region between the charge store and the optically sensitive material of the respective pixel region, wherein the charge store is in electrical communication with the optically sensitive material of the respective pixel region through the contact region. In some example embodiments, the contact region may be non-metallic. In other embodiments, the contact region may be metallic.

In example embodiments, noise reduction circuitry is included for each column of the pixel array. The noise reduction circuitry monitors the pixel during its reset period and extinguishes the reset sequence asynchronously when the pixel reaches a targeted reference level. In various embodiments, there may be two conditions for reducing the reset thermal noise. One condition is that the bandwidth of the thermal noise is lower than the bandwidth of the monitoring circuit. The ratio of these bandwidths will determine the fundamental limitation on the amount of noise reduction that can be realized. For example, to achieve N times thermal noise reduction, the bandwidth ratio usually exceeds N. The second condition is that the reset sequence can be terminated through a column-wise control signal. Because each pixel in the column produces uncorrelated noise with respect to all other pixels, each reset sequence can be terminated at the appropriate time independent from the other pixels. Typically, the reset transistor is activated though a row select line. Since it may be undesirable in some cases to add additional transistors or control lines to the pixel, a method can be implemented that terminates the reset by a feedback signal over one or both of the existing control lines. Typically, each pixel contains two column lines for readout. A drain line provides a voltage for the reset level and for the source follower. A source line provides the path for the readout voltage at the source follower under a column current bias circuit. By applying a signal to one or both of these control lines, the pixel's reset sequence may be terminated or otherwise reduced. Since total capacitance of the sense node is small, the pixel may be subject to large voltage changes due to capacitive feed-through. By utilizing the capacitive coupling from the column lines, the gate to source voltage of the reset transistor can be reduced by some amount to effectively terminate or reduce the reset condition.

When the output on the column line reaches the reference voltage, the noise reduction circuitry acts on the column line in a way that terminates or reduces the reset condition. In an example embodiment, a voltage, created by a switch or current source, is applied to the source side column line such that it produces sufficient charge coupling to reduce the gate to source voltage of the reset transistor. The gate to source capacitance of the source follower is the main coupling capacitance responsible for this action. Since the gate of the source follower is directly connected to the source of the reset transistor, a positive trending pulse at the source of the source follower has the effect of reducing the gate to source voltage of the reset transistor. In an example embodiment, the voltage on the source side column line is caused to rise at a rate exceeding the bandwidth of the thermal noise at the moment the pixel reaches the reference level. Since the thermal noise source does not have sufficient time to change the voltage at the pixel, the thermal noise is reduced below kT/C as a result of the faster monitoring and feedback circuit.

In another example embodiment, a voltage, created by a switch or current source, is applied to the drain side column line such that it produces a sufficient charge coupling that reduces the gate to source voltage of the reset transistor. The drain to source capacitance of the reset transistor is the main coupling capacitance responsible for this action. A positive trending pulse at the drain of reset transistor has the effect of reducing the gate to source voltage of the same reset transistor. In an example embodiment, the voltage on the drain column line is caused to rise at a rate exceeding the bandwidth of the thermal noise at the moment the pixel reaches the reference level, thereby reducing the sampled thermal noise level.

In another example embodiment, voltages, created by switches or current sources, are applied to the both the source and drain side column lines such that they produce sufficient charge coupling to reduce the gate to source voltage of the reset transistor. Both the gate to source capacitance of the source follower and the drain to source capacitance of the reset transistor form the coupling capacitance responsible for this action. A positive trending pulse at both the source and drain column lines have the effect of reducing the gate to source voltage of the reset transistor. In an example embodiment, the voltage on the column lines are caused to rise at a rate exceeding the bandwidth of the thermal noise at the moment the pixel reaches the reference level, thereby reducing the sampled thermal noise level.

In example embodiments, noise reduction circuitry is included on each column line used to read out pixels from the columns of a selected row. The noise reduction circuitry is configured to apply a voltage to the column line when a desired reset level has been achieved. The voltage applied to the column line acts to turn off the reset transistor when a threshold level has been met. Since the reset transistor can be turned off by the voltage on the column line instead of the reset switch itself, example embodiments can be used to reduce noise that is sampled onto the sense node to less than the square root of kT/C.

In example embodiments, the reset transistor is not necessarily turned off by column coupling but rather by the barrier threshold being increased by reduced $V_{gs}$ which slows the rate of current across the channel. For the time period of interest this may appear to be off.

In example embodiments, the additional circuitry for noise reduction is included for each column and additional circuitry is not required to be added to each pixel circuit. This dramatically decreases the additional circuitry required for noise reduction compared to embodiments where noise reduction circuitry is added to each pixel circuit.

In example embodiments, the noise reduction circuitry acts to turn off the reset transistor by applying a voltage to the same column line used to read out the pixel circuit. This allows reduced circuitry relative to embodiments which use a separate line for each column to provide feedback from noise reduction circuitry to the reset transistor.

The following is an overview of the operation of image sensors according to example embodiments. In example embodiments, these image sensors include additional noise reduction circuitry to apply a voltage back to the pixel circuit when a desired voltage threshold has been met in order to turn off the reset transistor and reduce noise. These image sensors are examples only and the noise reduction circuitry and methods may be used with other image sensors as well.

In some embodiments, a voltage is applied to the charge store and discharges due to the flow of current across the optically sensitive film over an integration period of time. At the end of the integration period of time, the remaining voltage is sampled to generate a signal corresponding to the intensity of light absorbed by the optically sensitive layer during the integration period. In other embodiments, the pixel region may be biased to cause a voltage to accumulate in a charge store over an integration period of time. At the end of the integration period of time, the voltage may be sampled to generate a signal corresponding to the intensity of light absorbed by the optically sensitive layer during the integration period. In some example embodiments, the bias across the optically sensitive layer may vary over the integration period of time due to the discharge or accumulation of voltage at the charge store. This, in turn, may cause the rate of current flow across the optically sensitive material to also vary over the integration period of time. In addition, the optically sensitive material may be a nanocrystal material with photoconductive gain and the rate of current flow may have a non-linear relationship with the intensity of light absorbed by the optically sensitive layer. As a result, in some embodiments, circuitry may be used to convert the signals from the pixel regions into digital pixel data that has a linear relationship with the intensity of light absorbed by the pixel region over the integration period of time. The nonlinear properties of the optically sensitive material can be used to provide a high dynamic range, while circuitry can be used to linearize the signals after they are read in order to provide digital pixel data. Example pixel circuits for read out of signals from pixel regions are described further below.

The image sensor may detect a signal from the photosensitive material in each of the pixel regions that varies based on the intensity of light incident on the photosensitive material. In one example embodiment, the photosensitive material is a continuous film of interconnected nanoparticles. Electrodes are used to apply a bias across each pixel area. Pixel circuitry is used to integrate a signal in a charge store over a period of time for each pixel region. The circuit stores an electrical signal proportional to the intensity of light incident on the optically sensitive layer during the integration period. The electrical signal can then be read from the pixel circuitry and processed to construct a digital image corresponding to the light incident on the array of pixel elements. In example embodiments, the pixel circuitry may be formed on an integrated circuit device below the photosensitive material. For example, a nanocrystal photosensitive material may be layered over a CMOS integrated circuit device to form an image sensor. Metal contact layers from the CMOS integrated circuit may be electrically connected to the electrodes that provide a bias across the pixel regions.

U.S. patent application Ser. No. 12/106,256, entitled "Materials, Systems and Methods for Optoelectronic Devices," filed Apr. 18, 2008 (U.S. Published Patent Application No. 2009/0152664) and U.S. patent application Ser. No. 13/051,320, entitled "Image Sensors Employing Sensitized Semiconductor Diodes," filed Mar. 18, 2011 (U.S. Published Patent Application No. 2001/0226934) includes additional descriptions of optoelectronic devices, systems, and materials that may be used in connection with example embodiments, both of which are hereby incorporated herein by reference in their entireties. This is an example embodiment only and other embodiments may use different photo-detectors and photosensitive materials. For example, embodiments may use silicon or Gallium Arsenide (GaAs) photodetectors.

In example embodiments, an image sensor may be provided with a large number of pixel elements to provide high resolution. For example, an array of 4, 6, 8, 12, 24, or more megapixels may be provided.

The use of such large numbers of pixel elements, combined with the desirability of producing image sensor integrated circuits having small areas such as diagonal dimensions of order ⅓ inch or ¼ inch, entails the use of small individual pixels. Desirable pixel geometries include, for example, 1.75 µm linear side dimensions, 1.4 µm linear side dimensions, 1.1 µm linear side dimensions, 0.9 µm linear side dimensions, 0.8 µm linear side dimensions, and 0.7 µm linear side dimensions.

In example embodiments, outputs from pixel circuitry for a selected row can be read via column lines. In example embodiments, noise reduction circuitry is included on the column lines. During a reset phase for the pixel circuitry, the noise reduction circuitry compares the output on the column line to a reference voltage, $V_{ref}$. This is an example only and other embodiments may use other thresholds for determining when to activate the noise reduction circuitry. When the output on the column line reaches the reference voltage or other threshold, the noise reduction circuitry acts on the column line in a way that turns off the reset transistor in the pixel circuitry. In an example embodiment, a voltage or current is applied to the column line that is sufficient to turn off the reset transistor. In an example embodiment, the voltage on the column line is caused to rise quickly once the threshold has been met and turn off the reset transistor. Since the reset transistor is now turned off by the action of the column voltage and not by the reset switch itself, the fixed relationship between the on-resistance of the reset switch and the bandwidth of the reset switch is decoupled, and the amount of noise that is sampled onto the sense node can be less than sqrt (kT/C).

Example pixel circuitry and noise reduction circuitry will now be described in additional detail. These are example only and other circuitry may be used in other embodiments.

In embodiments of the present invention, the variance in the noise associated with reset is reduced below the sqrt (kT/C) limit through the introduction of circuitry in the column. In embodiments, a comparator circuit is introduced that senses the voltage on the column and compares it to a reference voltage. When the column voltage is equal to $V_{ref}$, the comparator acts on the column in a way that turns off the reset transistor. In embodiments, the action of the comparator serves to lock in the reset voltage at the sense node. In embodiments, the amount of noise sampled onto the sense node can be less than sqrt (kT/C).

Figure 2:
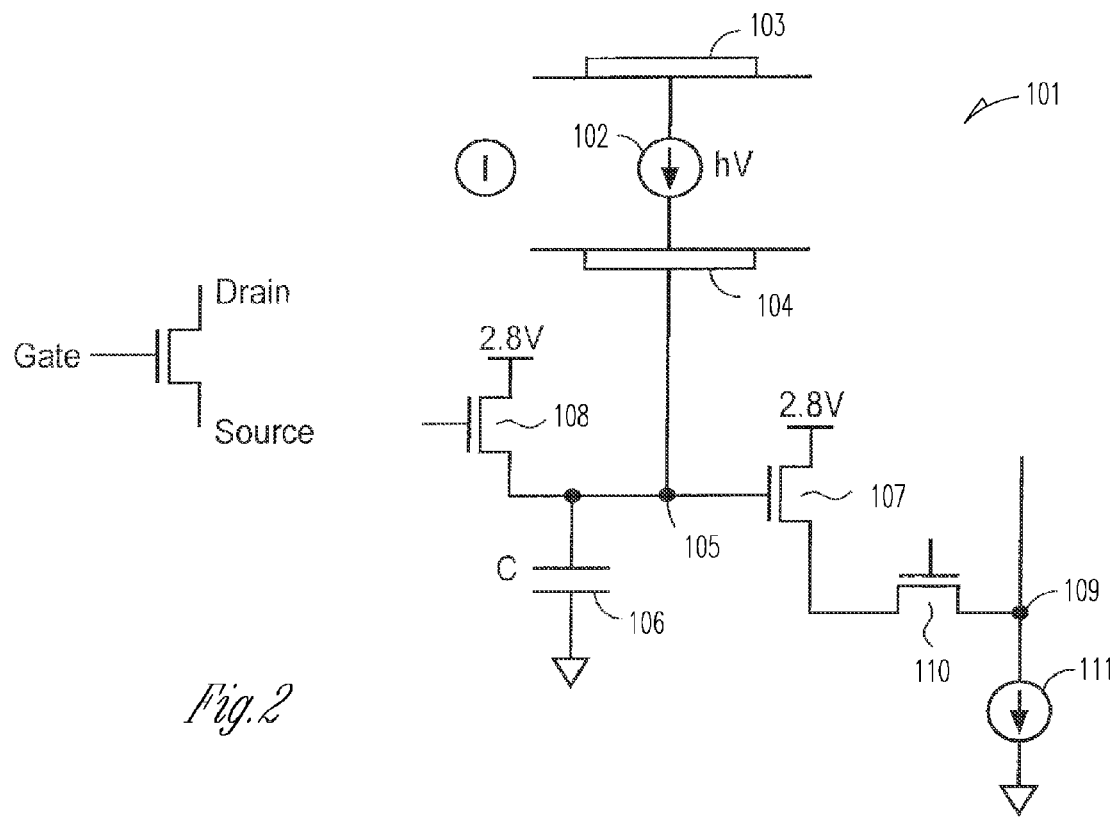
FIG. 2 shows an example of a representative 3-transistor pixel for a CMOS image sensor overlaid with a photo-responsive film.

In some example pixel circuits, an additional transistor, diode or other circuit element may be added to help control noise. In some example embodiments, however, a pixel circuit with only three transistors may be used (3-T pixel circuit) and noise reduction circuitry may be added for each column instead of requiring circuitry to be added to each pixel. FIG. 2 shows a representative 3-transistor pixel for a CMOS image sensor overlaid with a photo-responsive film.

A photo-responsive film 101 is represented both by a current source 102 whose magnitude is proportional to the amount of light incident on the pixel, and also as a physical material that is capped by a top electrode 103 and a bottom electrode 104. A sense node 105 is formed at the intersection of the bottom electrode 104 and the gate of a first transistor 107 and the source of a second transistor 108.

A parasitic capacitance, C, 106, is depicted in FIG. 2 at the sense node 105. This capacitance is not a manufactured circuit element, but is the result of parasitic capacitances between the top electrode 103 and the bottom electrode 4 of the photo-responsive film 101, the gate to source overlap capacitance of the second transistor 108, the gate to source and gate to drain overlap capacitances of the first transistor 107, the gate to ground capacitance of the first transistor 107, and the source to ground capacitance of the second transistor 108. The parasitic capacitance 106 is depicted as a separate element C in FIG. 2 only for discussion.

Figure 3:
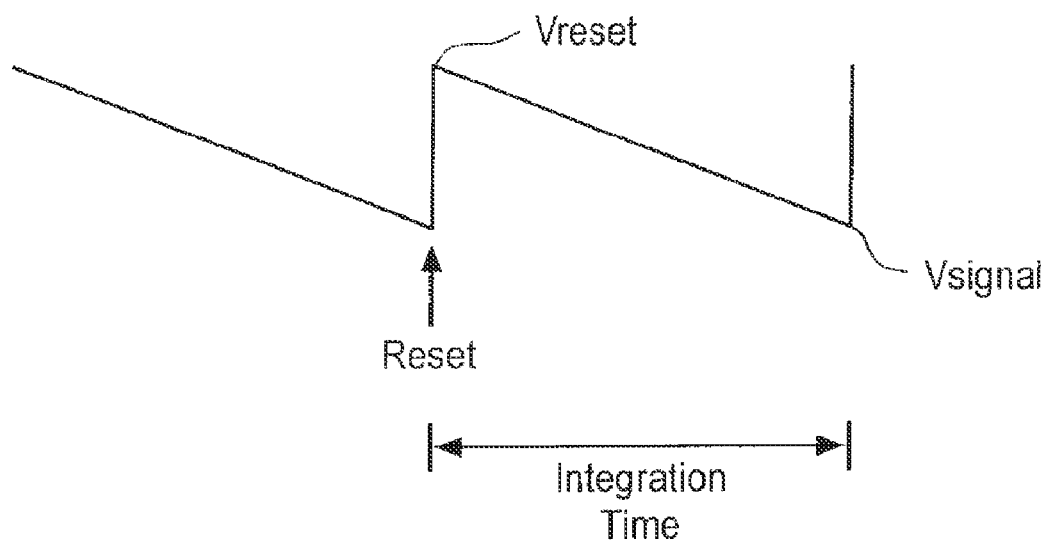
FIG. 3 shows an example of a representative voltage waveform, as measured at a sense node, as a function of time.

In normal pixel operation, the drains of the first transistor 107 and the second transistor 108 may be tied to a high DC voltage, such as, for example, 2.8 V. In various embodiments, the pixel operation can be described as follows:

With continuing reference to FIG. 2, FIG. 3 shows an example of a representative voltage waveform at the sense node 105 as a function of time. At the time labeled "reset," the gate of the second transistor 108 is raised to a high voltage (e.g., 2.8 V), which causes the second transistor 108 to turn on and which raises the voltage of the sense node to a "reset voltage," $V_{reset}$, that is approximately equal to the gate voltage (e.g., 2.8 V) minus the threshold voltage of the second transistor 8 (e.g., 0.6 V). Therefore the sense node is reset to approximately 2.2 V.

After the sense node 105 is reset, incident light on the photo-responsive film 101 causes a current to flow onto the sense node 105. This photo current drives charge onto the sense node 105, which causes the voltage of the sense node 105 to fall, as shown in FIG. 3. After a period of time (the integration time), the final signal level ($V_{signal}$) of the sense node 105 is reached, and shortly afterwards, the pixel is reset once again.

In various embodiments, the read out of the sense node voltage can be described as follows:

In order to know how much light fell on the pixel during the integration time, two voltages, the "reset voltage" and the "signal voltage" must be read out from the pixel. The difference between these two voltages is proportional to the amount of light that fell on the pixel during the integration time.

With reference again to FIG. 2, in order to read out the voltages on the sense node 105, the first transistor 107 is connected to an output node 109 through a read transistor 110. The output node 109 is connected to a plurality of pixels. Each pixel is attached to the common output node 109 one at a time by raising the gate voltage of the read transistor 110. The output node 109 is further attached to a current source 111. When the pixel is attached to the output node 109, the current source 111 acts as a load on the first transistor 107 and forms a "source follower" type voltage buffer that tracks the sense node voltage and drives it onto the common output node 109. When attached in this way, the voltage on the output node 109 is approximately equal to the voltage on the sense node 105 minus the threshold voltage of the first transistor 107. In this way, the voltage of the sense node 105 can be read by measuring the voltage of the output node 109.

Figure 4:
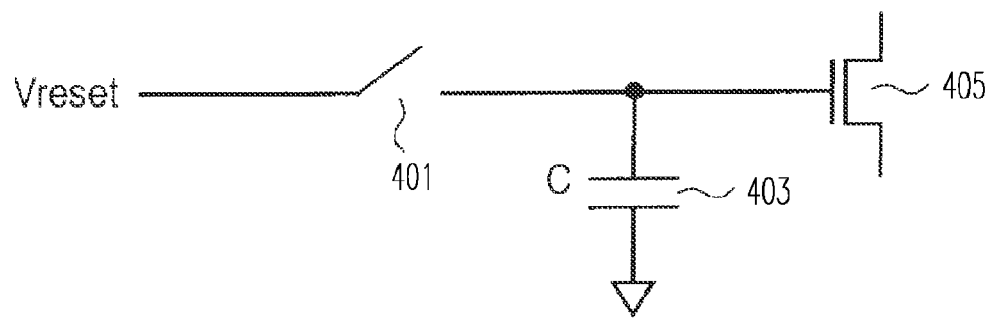
FIG. 4 shows a simplified schematic of a pixel during reset in an example embodiment.

In various embodiments, the pixel is reset to a "reset voltage" after each integration time. FIG. 4 shows a simplified schematic of the pixel during reset in an example embodiment. A person of ordinary skill in the art will recognize that certain ones of the components of FIG. 4 may be the same or similar to certain components of FIG. 2. A transistor 405 is depicted as an ideal switch, and the sense node is depicted as an ideal capacitance, C, 403. The transistor 405 has an on-resistance=4 kTR and this on-resistance is integrated over a bandwidth defined by the on-resistance and the sense node capacitance C. This results in a noise voltage equal sqrt (kT/C) being added to the reset voltage each time the pixel is reset, where k is a constant, T is the absolute temperature, and C is the capacitance of the sense node. In CMOS image sensors, the capacitance of the sense node may be fixed by the pixel size, and so the magnitude of this kT/C noise may also a fixed value.

In example embodiments, we are not dealing with 4 KTR as an "on resistance," but rather the transconductance of the reset device. For example, the pixel may see an "on resistance" period that is typically referred to as triode or linear region during hard reset. At all ranges of illumination, the pixel is reset into subthreshold when it enters soft reset and it is the transconductance equations in subthreshold that modulate noise magnitude and bandwidth.

Various embodiments of the present invention include a method to reset the pixel in a way that results in less than sqrt (kT/C) of noise being left on the sense node after the pixel is reset. This may be accomplished through the circuit shown in FIG. 5.

Figure 5:
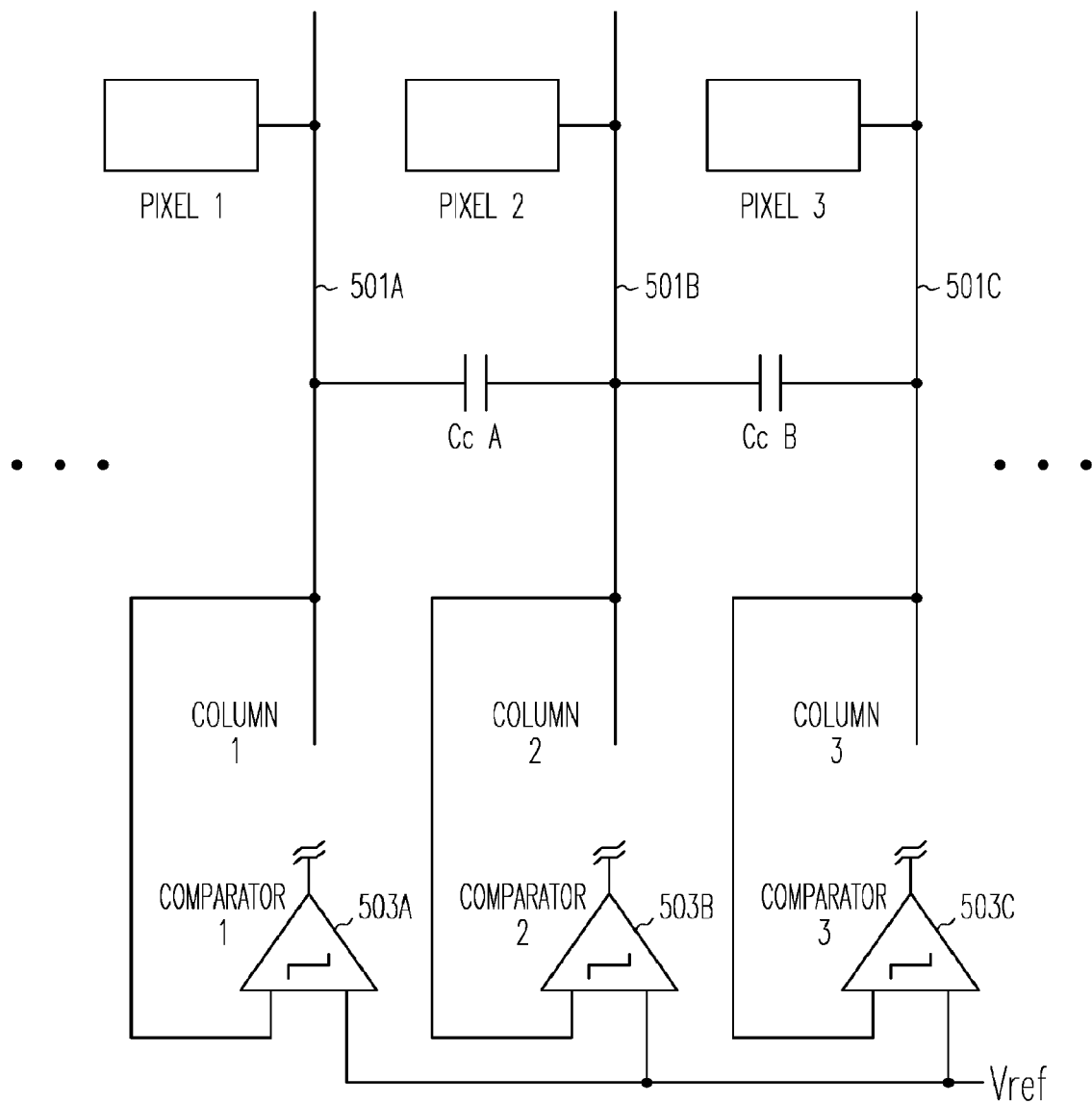
FIG. 5 shows an example of a simplified schematic diagram with a comparator arranged to sense voltage on a column for each pixel and compare the voltage to a reference voltage according to an embodiment.

In FIG. 5, a comparator 503A . . . 503C is introduced at the end of every column 501A . . . 501C in the image sensor. This comparator senses the voltage on the column for each pixel and compares it to a reference voltage $V_{ref}$. When the column voltage is equal to $V_{ref}$, the comparator acts on the column in a way that turns off the reset transistor (e.g., the second transistor 108 of FIG. 2).

Figure 6:
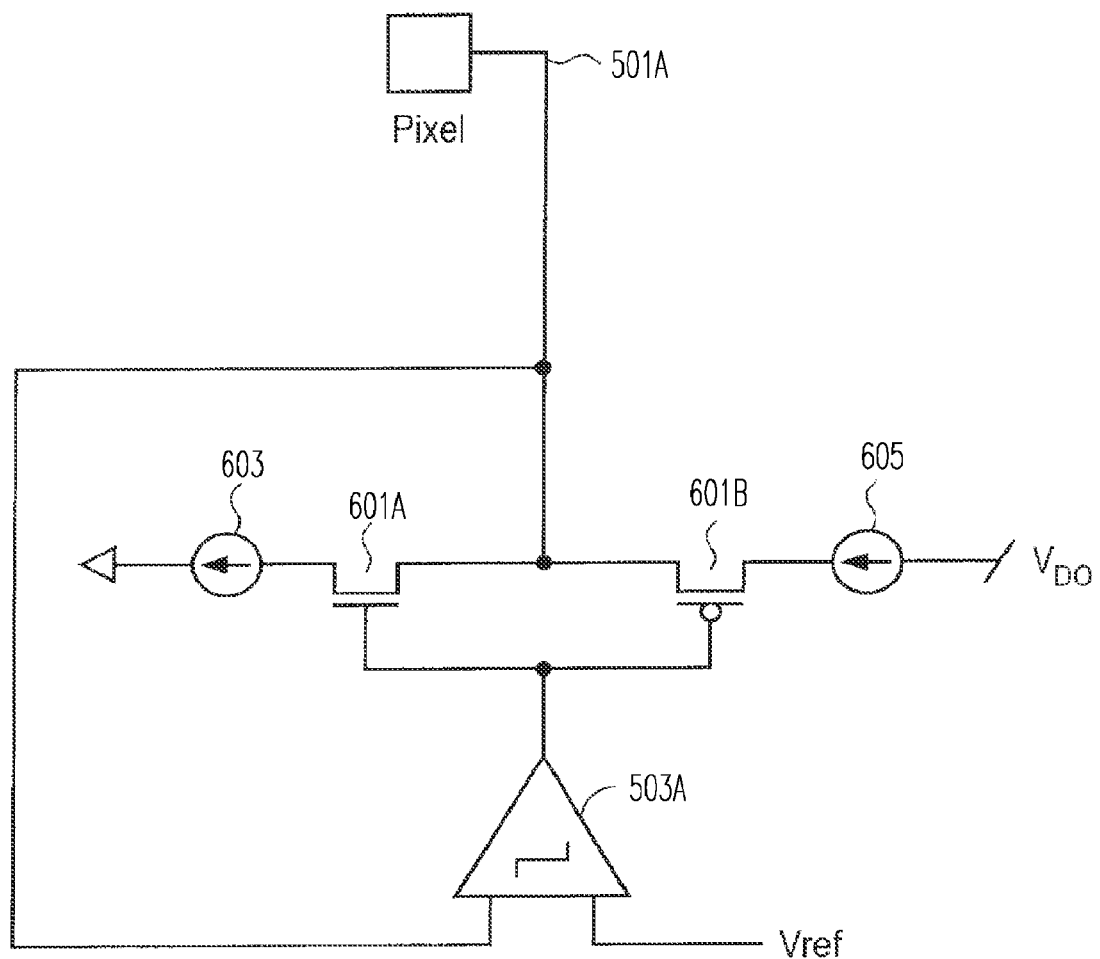
FIG. 6 shows an example of a simplified schematic diagram to indicate that when a column voltage is equal to the reference voltage, the comparator acts on the column in a way that turns off the reset transistor, according to an embodiment.

In an example embodiment, one way that the second transistor 108 can be turned off by the comparator 503 is depicted in FIG. 6. In this figure, transistors 601A and 601B have been added to each column 501. When the output of the comparator 503 is low, transistor 601 is on and transistor 601B is off. In this state, a current source 603 is connected to the column 501 as in FIG. 1, and acts as a load for the source follower, as before. When the comparator is high, transistor 601A turns off and transistor 601B turns on, which disconnects the current source 603 from the column 501 and connects the current source 605. This action forces the voltage of the column 501 to rise quickly.

Figure 7A:
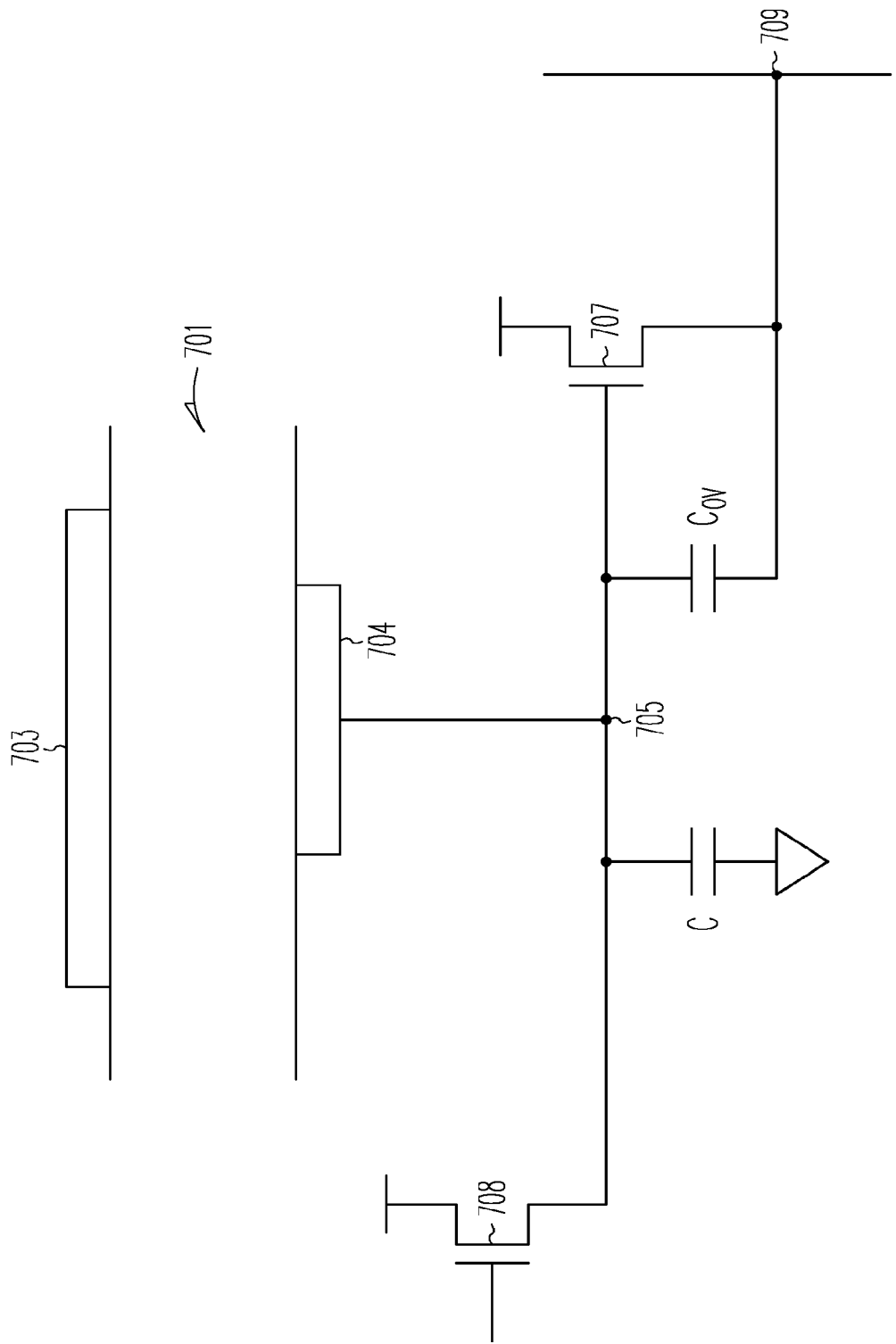
FIG. 7AA shows a simplified model of a pixel with an overlap capacitance added between the column and the sense node, according to an embodiment.

With reference to FIG. 7AA, a skilled artisan will recognize that certain components may be the same or similar to components shown in FIG. 2. FIG. 7AA depicts an example embodiment of a simplified model of the pixel with an overlap capacitance $C_{ov}$ added between the column 709 and the sense node 705. This capacitance results from the overlap of the gate electrode of transistor 707 to its source node, which is connected to the column 709. The circuit of FIG. 7AA makes use of this overlap capacitance to push up the voltage at the source of the second transistor 108 when the voltage of the column 501 is pushed up by the current source 605. This raising of the source voltage of the second transistor 108 acts to effectively turn off the transistor and to lock in the reset voltage at the sense node.

Since the reset transistor is now turned off by the action of the column voltage and not by the reset switch itself, the previous fixed relationship between the on-resistance of the reset switch and the bandwidth of the reset switch is de-coupled, and the amount of noise that is sampled onto the sense node can be less than sqrt kT/C.

Figure 7:
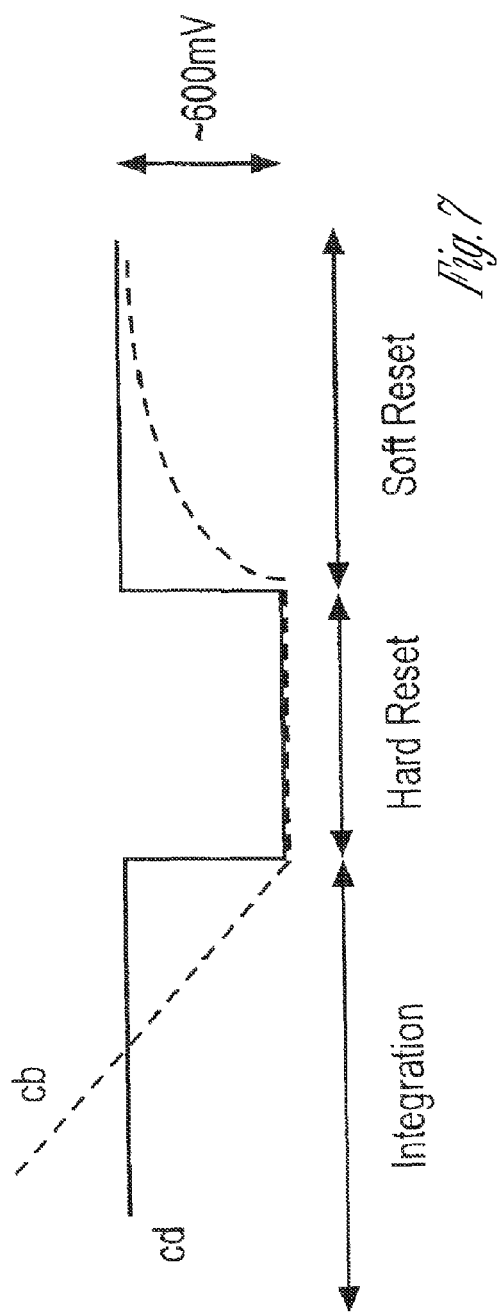
FIG. 7 shows a voltage diagram indicating an integration, a "hard reset" phase, and a "soft reset" phase, according to an embodiment.

With reference now to FIG. 7, the pixel exits a "hard reset" phase and enters a "soft reset" phase. The column voltage rises towards $V_{dd}$ in the soft reset phase, and, in example embodiments, the on-resistance of the reset transistor may increase by 10× for every 0.1 V (subthreshold operation). Every column has a comparator that compares the rising column voltage to a reference voltage and turns off the reset transistor when the two voltages are equal. When the column voltage is approximately equal to the reference voltage (the time may be slightly different for every pixel) the comparator fires, and switches the direction of the current at the bottom of the column, which causes the column voltage to rise abruptly, which turns off the reset transistor and locks the column voltage to a voltage that is displaced from $V_{ref}$ by an amount that is less than kTC volts rms away from the ideal $V_{ref}$. In example embodiments, a hard reset may be the triode region or linear region of operation. A soft reset is the subthreshold region. In example embodiments, transconductance is monotonically decreasing in subthreshold and the bandwidth is lowering.

In various embodiments, voltage at a sense node slowly traverses up toward $V_{dd}$. The reset transistor is in sub-threshold state when $V_{gs}$ of the transistor is less than the $V_t$ of the transistor. This operates according to a known set of characteristics. In certain examples, the "on" resistance may decrease by an order of magnitude (10×) for every 0.1 volts. The "on" resistance rapidly increases. The reason that is important is that as the "on" resistance gets higher and higher, the bandwidth of that node gets higher and higher. In example embodiments, the threshold voltage is selected such that the reset transistor is at very high impedance and therefore has low bandwidth. The hard-soft reset technique can modulate the reset switch resistance and provide feedback during turn-off, thereby reducing its thermal noise.

Figure 8:
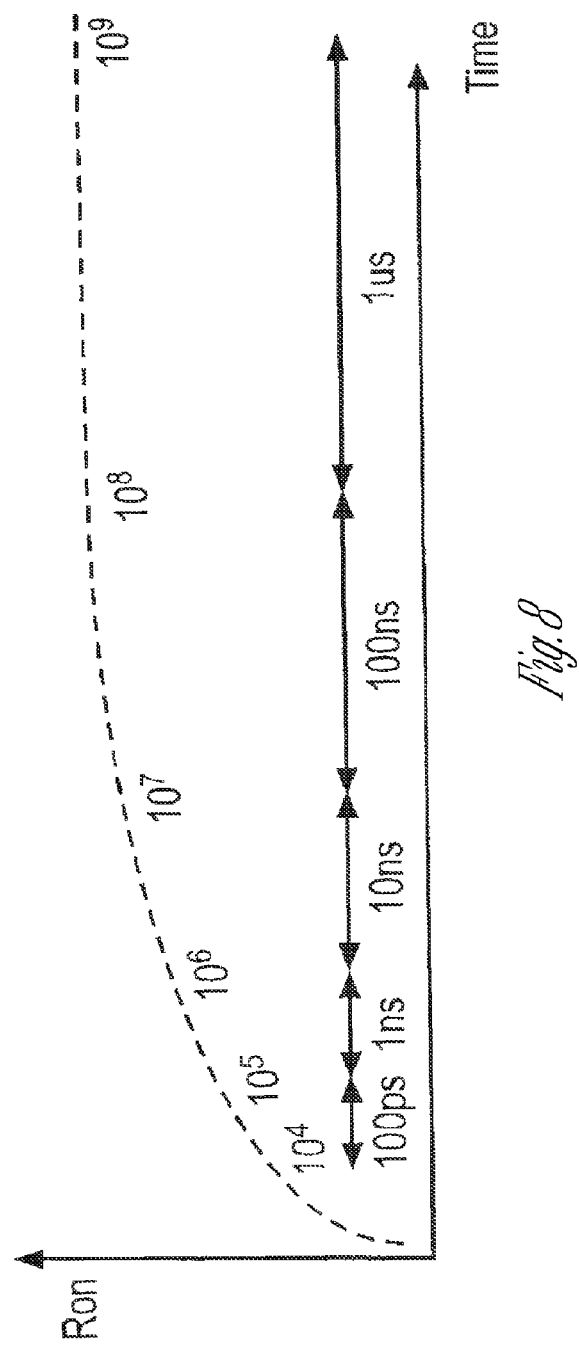
FIG. 8 shows a diagram indicating resistance as a function of time; in example embodiments, the hard-soft reset technique can modulate the reset switch resistance and provide feedback during turn-off, thereby reducing thermal noise.

Referring to FIG. 8, the feedback bandwidth can be higher ($R_{on}$ is rising). In example embodiments, the reference voltage may be selected where $R_{on}$ is a mega ohm or higher. This makes the loop bandwidth low and makes it easier to have a higher feedback loop bandwidth. In example embodiments, the threshold voltage is selected such that the reset transistor is in the sub-threshold mode when the threshold voltage is reached. For example, the threshold voltage may be set to a value where $R_{on}$ is high (e.g., a range of one-half mega ohm or higher, for example one mega ohm in some embodiments) and bandwidth is low (e.g., where bandwidth equals 1/(2 pi*$R_{on}$*Capacitance of sense node), the denominator is therefore 2 pi RC. In some embodiments, C may be 2 femto Farads. $R_{on}$ may be approximately about 1 mega ohm to about 10 mega ohms at the reference voltage (the unit of measure of bandwidth is hertz). In various embodiments, during soft reset, the reset switch resistance in weak-inversion changes by approximately one order of magnitude, in decade time steps, per, for example, a 100 mV change in $V_{ds}$. The comparator trip point may, in this embodiment, be set to when the switch resistance is about $10^8$ ohms.

Figure 9A:
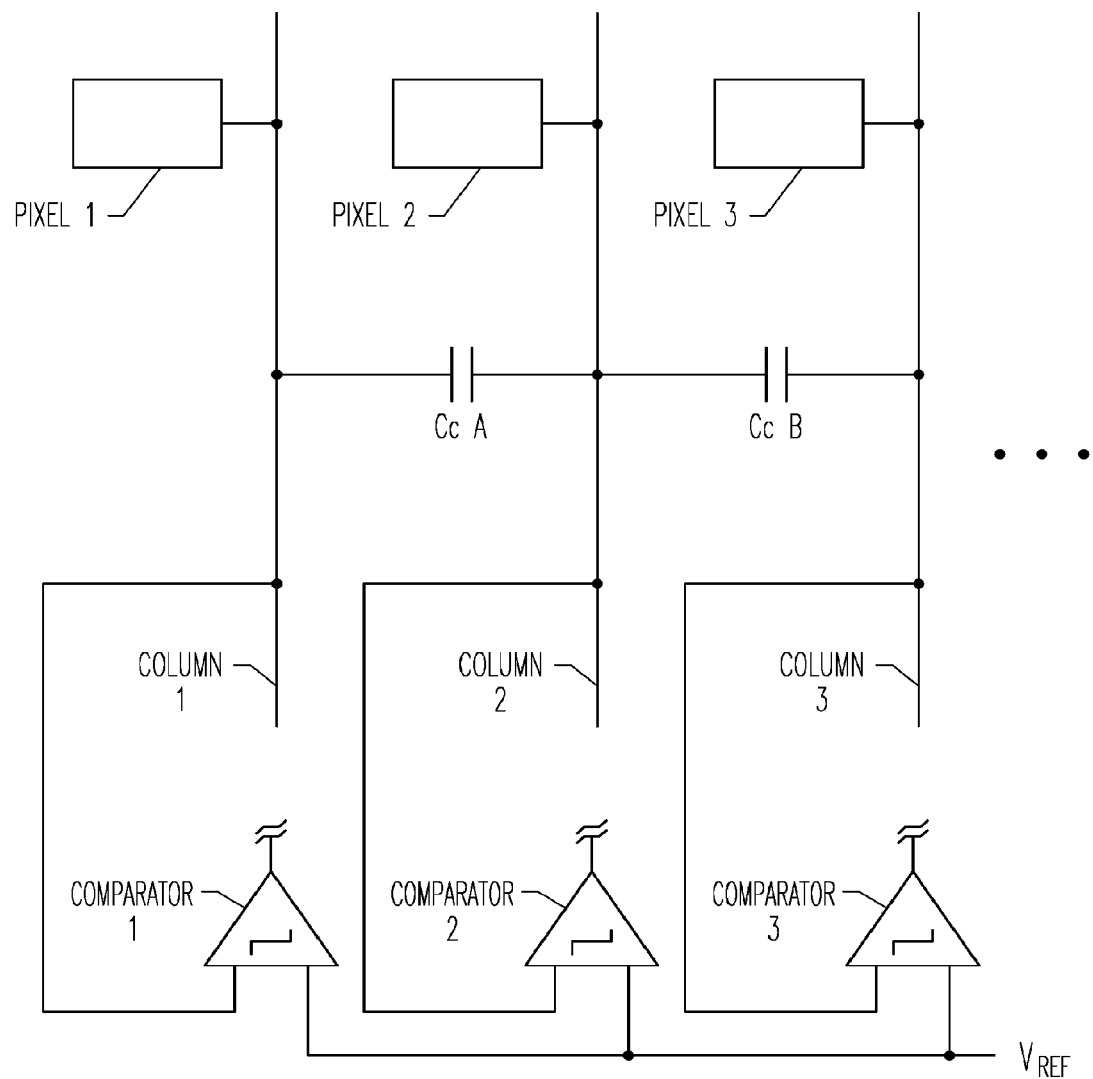
FIG. 9A shows a diagram with three adjacent pixels and their adjacent columns and respective comparators, according to an embodiment

FIG. 9A shows three adjacent pixels and their adjacent columns and their respective comparators. Each column line has parasitic capacitances that couple it to its neighbors. If the voltage on column 2 rises abruptly, it is possible that the coupling capacitors will also cause the voltages of columns 1 and 3 to rise, and in doing so, to turn off the reset transistors in columns 1 and 3. In this example, the voltage that locked in on columns 1 and 3 may not be correct, though it was correct for column 2. This situation may result in greater displacement from $V_{ref}$ than would result if the columns 1 and 3 were to be reset by their own comparators.

Figure 9B:
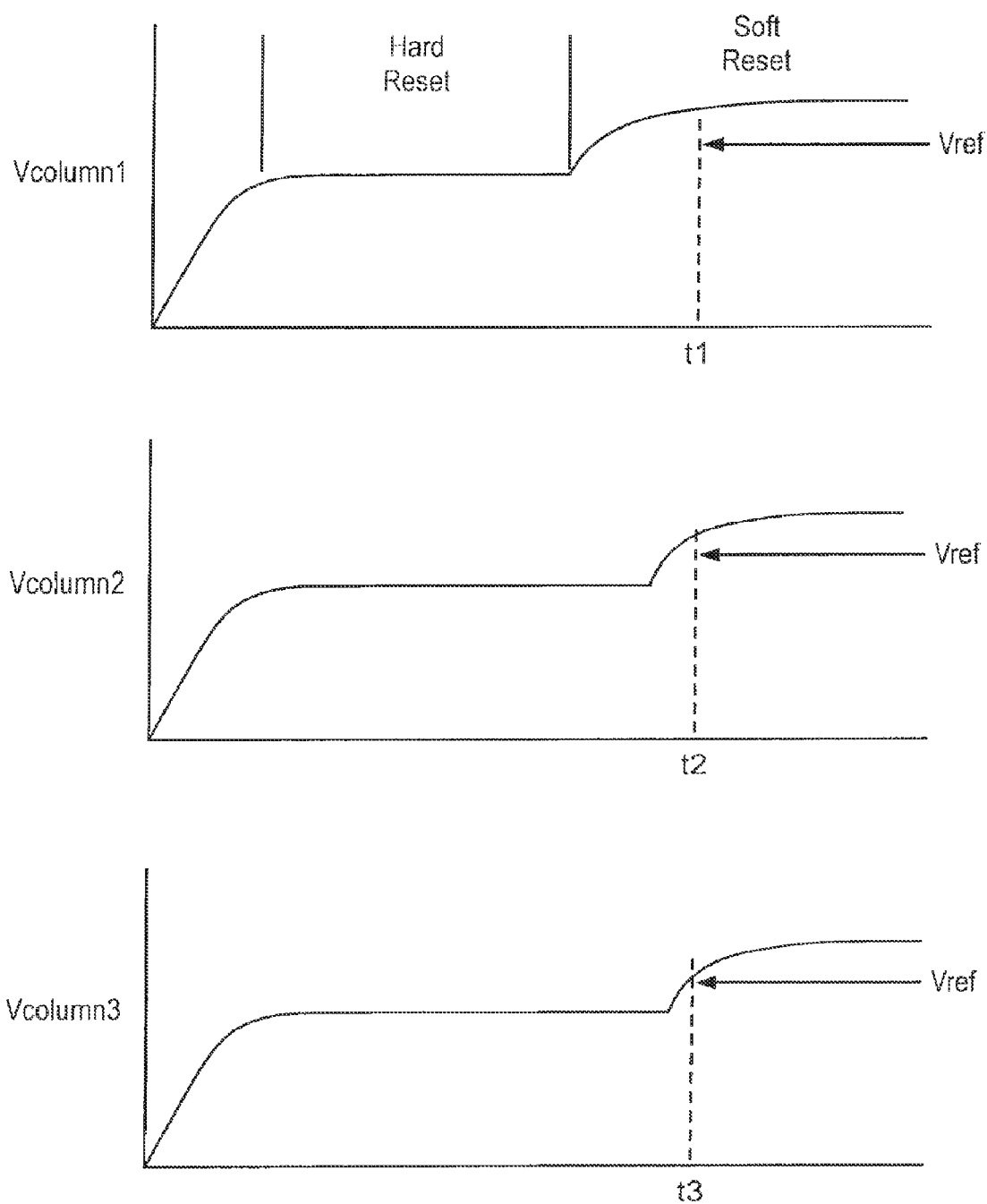
FIG. 9B shows column voltages for each column as a function of time, in accordance with the example diagram of FIG. 9A.

Refer to FIG. 9B which shows the column voltages for each column as a function of time. Since each column enters the soft reset phase at approximately the same time, the time when the rising voltage for each column reaches approximately the reference voltage is about the same, as shown by the times t1, t2 and t3 in the figure. Therefore, a small displacement of the column voltages of columns 1 and 3 that resulted from an abrupt voltage transition of column2, may be sufficient to cause a premature turning off of the reset transistors in pixels 1 and 3 and an incorrect voltage being locked in for those columns.

Figure 10:
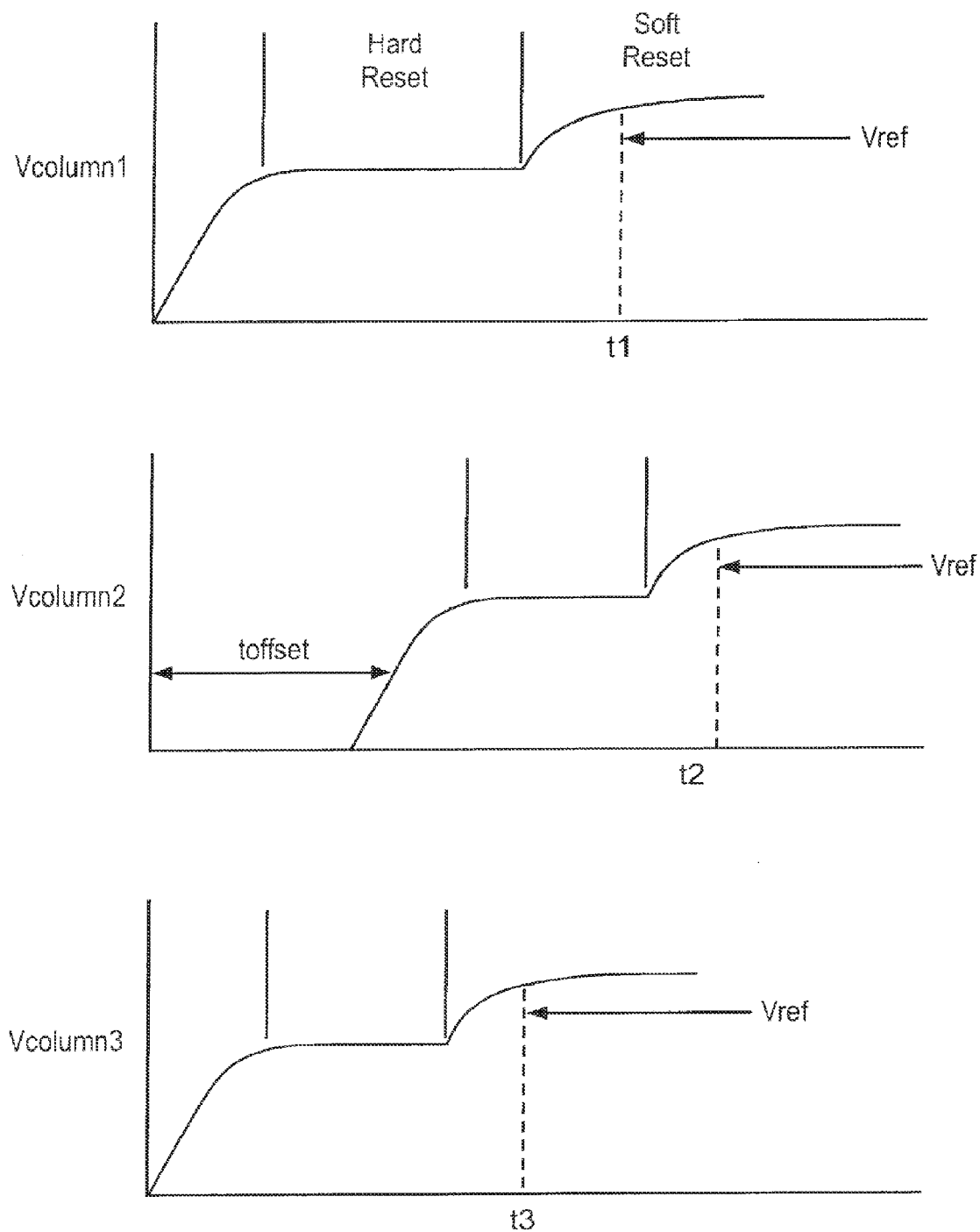
FIG. 10 shows voltage diagrams of three columns, according to an embodiment.

Refer now to FIG. 10. If the time when columns 1 and 3 enter soft reset is displaced in time from the time when column 2 enters soft reset, as shown in the figure, then it can be assured that the neighboring column voltages are not near to the reference voltage when the abrupt transition occurs on column 2. Further enhancements of this idea can be imagined.

Figure 11:
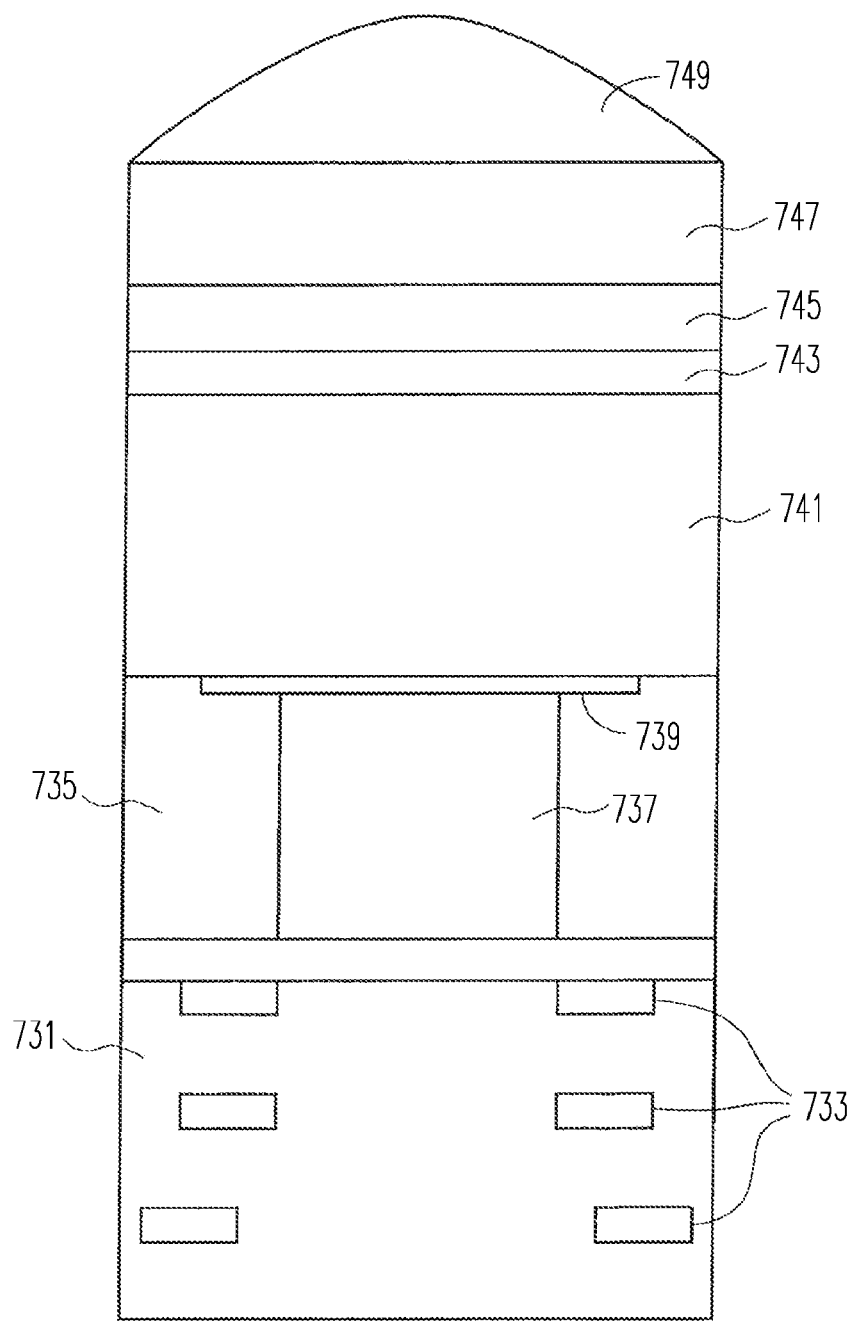
FIG. 11 shows an example embodiment of a cross-section of a back-side illuminated CMOS image sensor pixel in which an optically sensitive material has been integrated in intimate contact with the silicon photodiode.

FIG. 11 depicts an example embodiment of a cross-section of a back-side illuminated CMOS image sensor pixel in which an optically sensitive material has been integrated in intimate contact with the silicon photodiode. 735 depicts a silicon substrate on which the image sensor is fabricated. 737 depicts a diode formed in silicon. 733 is the metal interconnect and 731 the interlayer dielectric stack that serves to provide communication of electrical signals within and across the integrated circuit. 741 is an optically sensitive material that is the primary location for the absorption of light to be imaged. 743 is a transparent electrode that is used to provide electrical biasing of the optically sensitive material to enable photocarrier collection from it. 745 is a passivation layer that may consist of at least one of an organic or polymer encapsulant (such as parylene) or an inorganic such as $Si_3N_4$ or a stack incorporating combinations thereof. 745 serves to protect the underlying materials and circuits from environmental influences such as the impact of water or oxygen. 747 is a color filter array layer that is a spectrally-selective transmitter of light used in aid of achieving color imaging. 749 is a microlens that aids in the focusing of light onto the optically sensitive material. 739 is a material that resides between the optically sensitive material 741 and the diode 737. 739 may be referred to as an added pinning layer. Example embodiments include a p-type silicon layer. Example embodiments include a non-metallic material such as a semiconductor and/or it could include polymer and/or organic materials. In embodiments, material 739 may provide a path having sufficient conductivity for charge to flow from the optically sensitive material to the diode, but would not be metallic interconnect. In embodiments, 739 serves to passivate the surface of the diode and create the pinned diode in this example embodiment (instead of the optically sensitive material, which would be on top of this additional layer).

Figure 12:
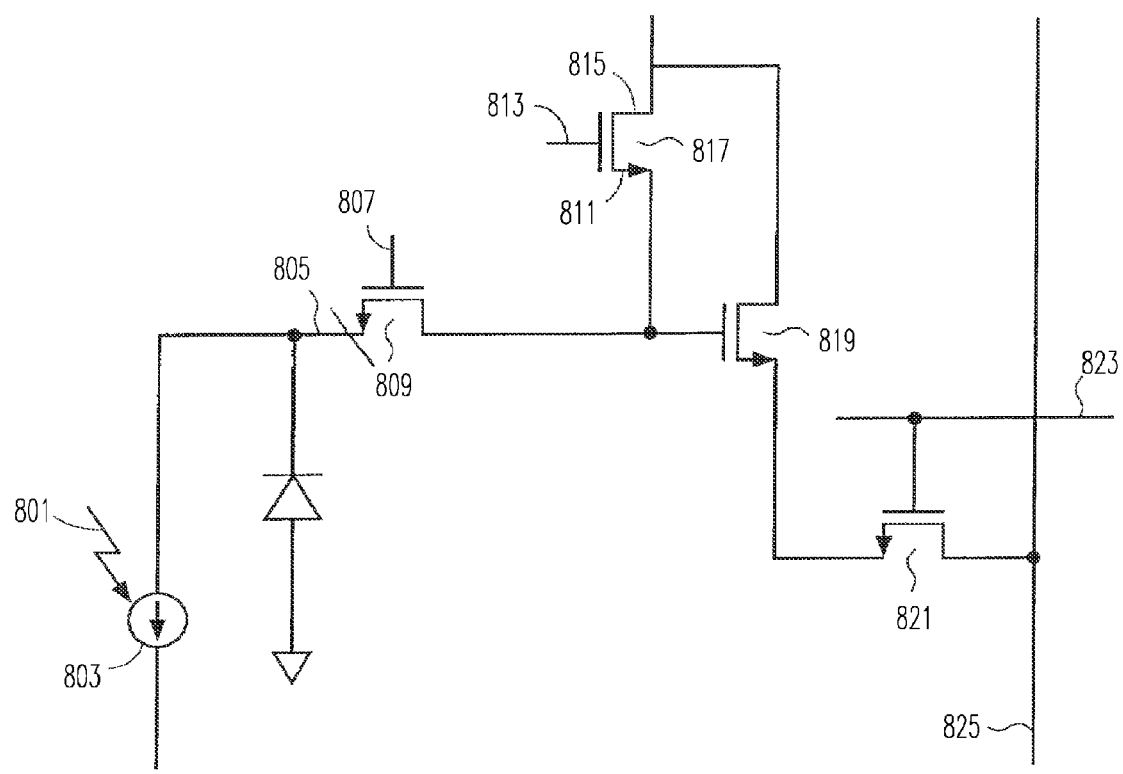
FIG. 12 is a circuit diagram for an example embodiment of a back-side illuminated image sensor in which optically sensitive material is integrated to a silicon chip from the back side.

FIG. 12 is a circuit diagram for an example embodiment of a back-side illuminated image sensor in which optically sensitive material is integrated to a silicon chip from the back side. 801 depicts light illuminating the optically sensitive material (filled circle with downward-pointing arrow). 803 is an electrode that provides bias across the optically sensitive material. With reference to U.S. Published Patent Application No. 2001/0226934, the electrode 803 may correspond to a top transparent electrode (711 of FIG. 7A) or to the region of the silicon substrate used to provide electrical biasing (743 of FIG. 7B). 805 is the silicon diode (corresponding to 603, 633, 653, 707, and 737 in FIGS. 6A, 6B, 6C, 7A, and 7B, respectively). 805 may also be termed the charge store. 805 may be termed the pinned diode. 807 is an electrode on the front side of silicon (metal), which ties to transistor gate of M1. 809 is the transistor M1, which separates the diode from sense node and the rest of the readout circuitry. The gate of this transistor is 807. A transfer signal is applied to this gate to transfer charge between the diode and the sense node 811. 811 is the sense node. It is separated from diode, allowing flexibility in the readout scheme. 813 is an electrode on the front side of silicon (metal), which ties to the transistor gate of M2. 815 is an electrode on the front side of silicon (metal), which ties to transistor drain of M2. 815 may be termed a reference potential. 815 can provide VDD for reset. 817 is the transistor M2, which acts as a reset device. It is used to initialize the sense node before readout. It is also used to initialize the diode before integration (when M1 and M2 are both turned on). The gate of this transistor is 813. A reset signal is applied to this gate to reset the sense node 811. 819 is transistor M3, which is used to read out the sense node voltage. 821 is transistor M4, which is used to connect the pixel to the readout bus. 823 is an electrode on the front side of silicon (metal), which ties to the gate of M4. When it is high, the pixel driving the readout bus $v_{col}$. 825 is the readout bus $v_{col}$. 801 and 803 and 805 reside within the backside of silicon. 807-825 reside within the frontside of silicon, including metal stack and transistors.

With continuing reference to FIG. 12, the diagonal line is included to help describe the backside implementation. The transistors to the right of this line would be formed on the front side. The diode and optically sensitive material on the left would be on the back side. The diode would extend from the back side through the substrate and near to the front side. This allows a connection to be formed between the transistors on the front side to transfer charge from the diode to the sense node 811 of the pixel circuit.

The pixel circuit of FIG. 12 may be defined as the set of all circuit elements in the figure, with the exception of the optically sensitive material. The pixel circuit includes the read-out circuit, the latter include a source follower transistor 819, row select transistor 821 with row select gate 823, and column read out 825. In an example embodiment, the column read out 825 could be connected to the comparator circuits described above to perform the noise reduction.

Figure 13:
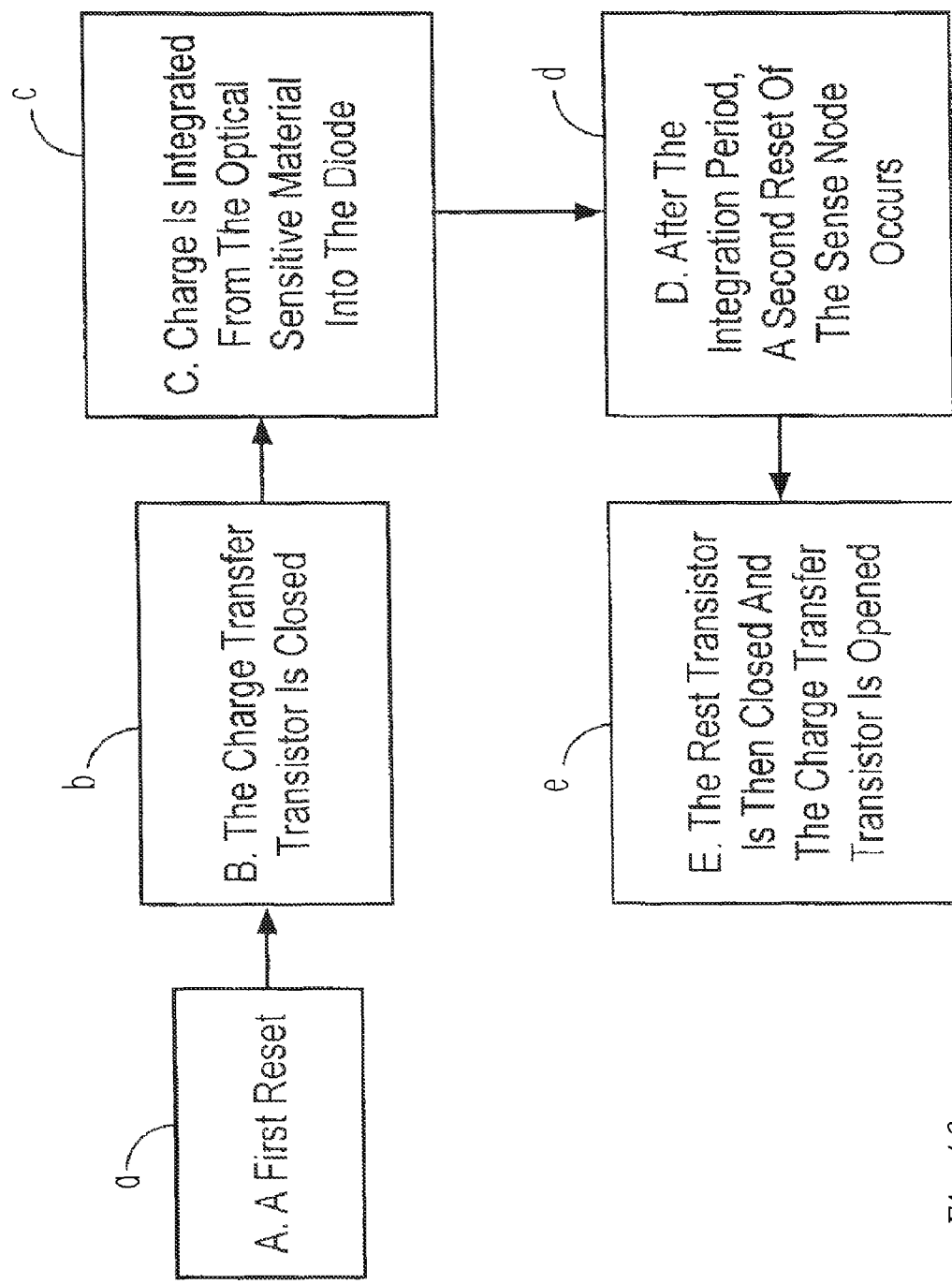
FIG. 13 shows a method of operation of a pixel circuit, according to various embodiments.

Referring now to FIG. 13, in embodiments, the pixel circuit may operate in the following manner:

A first reset (FIG. 13 at "a") is performed to reset the sense node (811 from FIG. 12) and the diode (805 from FIG. 12) prior to integration. Reset transistor (817 from FIG. 12) and charge transfer transistor (809 from FIG. 12) are open during the first reset. This resets the sense node (811 from FIG. 12) to the reference potential (for example 3 Volts). The diode is pinned to a fixed voltage when it is depleted. The fixed voltage to which the diode is pinned may be termed the depletion voltage of the diode. The reset depletes the diode which resets its voltage (for example, to 1 Volt). Since it is pinned, it will not reach the same voltage level as the sense node.

The charge transfer transistor (809 from FIG. 12) is then closed (FIG. 13 at "b") to start the integration period which isolates the sense node from the diode.

Charge is integrated (FIG. 13 at "c") from the optically sensitive material into the diode during the integration period of time. The electrode that biases the optically sensitive film is at a lower voltage than the diode (for example 0 Volts) so there is a voltage difference across the material and charge integrates to the diode. The charge is integrated through a non-metallic contact region between the material and the diode. In embodiments, this is the junction between the optically sensitive material and the n-doped region of the diode. In embodiments, there may reside other non-metallic layers (such as p-type silicon) between the optically sensitive material and the diode. The interface with the optically sensitive material causes the diode to be pinned and also passivates the surface of the n-doped region by providing a hole accumulation layer. This reduces noise and dark current that would otherwise be generated by silicon oxide formed on the top surface of the diode.

After the integration period, a second reset (FIG. 13 at "d") of the sense node occurs immediately prior to read out (the reset transistor is turned on while the diode remains isolated). This provides a known starting voltage for read out and eliminates noise/leakage introduced to the sense node during the integration period. The double reset process for pixel read out is referred to as true correlated double sampling.

The reset transistor is then closed and the charge transfer transistor is opened (FIG. 13 at "e") to transfer charge from the diode to the sense node which is then read out through the source follower and column line.

Figure 14:
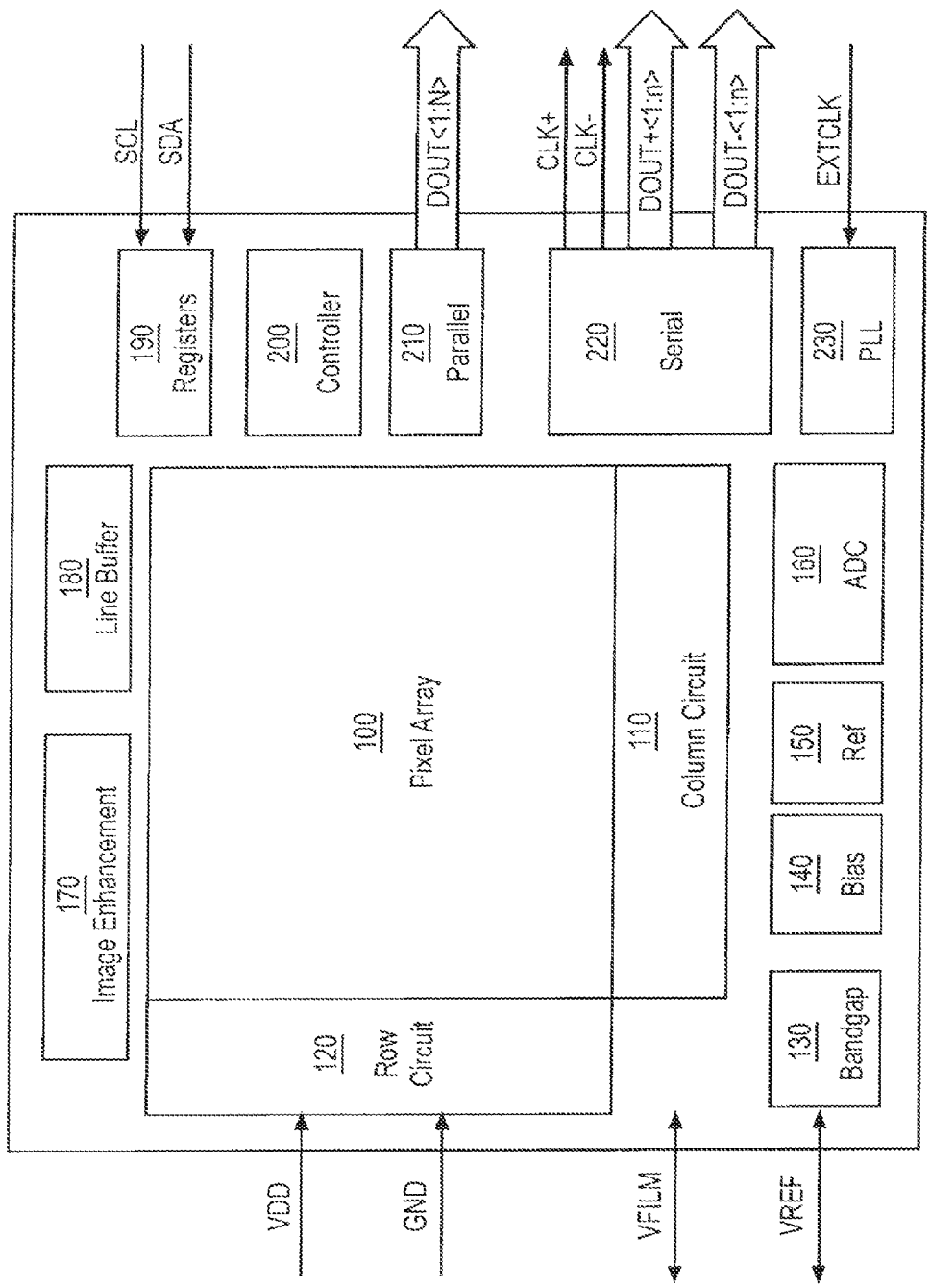
FIG. 14 is a block diagram of an image sensor integrated circuit (also referred to as an image sensor chip), according to an embodiment.

An example integrated circuit system that can be used in combination with the above photodetectors, pixel regions and pixel circuits will now be described in connection with FIG. 14. FIG. 14 is a block diagram of an image sensor integrated circuit (also referred to as an image sensor chip). The chip includes:

a pixel array (100) in which incident light is converted into electronic signals, and in which electronic signals are integrated into charge stores whose contents and voltage levels are related to the integrated light incident over the frame period;

row and column circuits (110 & 120) which are used to reset each pixel, and read the signal related to the contents of each charge store, in order to convey the information related to the integrated light over each pixel over the frame period to the outer periphery of the chip (in various embodiments, the column circuit 110 could include the noise reduction circuitry (comparators etc.) discussed herein);

analog circuits (130, 140, 150, 160, 230). The pixel electrical signal from the column circuits is fed into the analog-to-digital conver (160) where it is converted into a digital number representing the light level at each pixel. The pixel array and ADC are supported by analog circuits that provide bias and reference levels (130, 140, & 150);

digital circuits (170, 180, 190, 200). The Image Enhancement circuitry (170) provides image enhancement functions to the data output from ADC to improve the signal to noise ratio. Line buffer (180) temporarily stores several lines of the pixel values to facilitate digital image processing and IO functionality. (190) is a bank of registers that prescribe the global operation of the system and/or the frame format. Block 200 controls the operation of the chip;

IO circuits (210 & 220) support both parallel input/output and serial input/output. (210) is a parallel IO interface that outputs every bit of a pixel value simultaneously. (220) is a serial IO interface where every bit of a pixel value is output sequentially; and a phase-locked loop (230) provides a clock to the whole chip.

While example embodiments of the present invention have been shown and described herein, it will be obvious to those skilled in the art that such embodiments are provided by way of example only. Numerous variations, changes, and substitutions will now occur to those skilled in the art without departing from the invention.

For example, methods to affect the bandwidth of the thermal noise may include, for example, ramping the reset gate to reduce the transconductance at a faster rate. This may be useful in order to achieve higher frame rates. Both the self-regulating method of transconductance control as well as accelerated reduction in transconductance can be of value in certain embodiments. Another way is through barrier lowering.

It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. An image sensor circuit, comprising:
   a pixel circuit including read out circuitry, the read out circuitry including at least one control line, the read out circuitry being configured to be coupled to an output node during a reset of the pixel circuit; and
   noise reduction circuitry configured to be coupled to the output node during the reset of the pixel circuit, the noise reduction circuitry being configured to apply a signal to the at least one control line of the read out circuitry based on a determination that the output of the read out circuitry reached a threshold level during the reset of the pixel circuit, the noise reduction circuitry being further configured to apply a second signal to a source of the first transistor after the output of the read out circuitry reaches a threshold level during the reset of the pixel circuit.

2. The image sensor circuit of claim 1, wherein the output node comprises a column line configured to be selectively coupled to the read out circuitry for read out of the pixel circuit.

3. The image sensor circuit of claim 1, wherein the noise reduction circuitry is configured to apply the signal to the read out circuitry over a column line.

4. The image sensor circuit of claim 1, wherein the signal comprises a voltage applied to the control line.

5. The image sensor circuit of claim 1, wherein the signal comprises a current applied to the control line.

6. The image sensor circuit of claim 1, wherein the control line is a column-wise control signal.

7. The image sensor circuit of claim 1, wherein the control line is configured to extinguish the reset of the pixel circuit after the signal is applied.

8. The image sensor circuit of claim 1, wherein the control line is configured to extinguish the reset of the pixel circuit asynchronously after the signal is applied.

9. The image sensor circuit of claim 1, wherein the pixel circuit further includes reset circuitry having thermal noise.

10. The image sensor circuit of claim 9, wherein the noise reduction circuitry has a bandwidth that is higher than a bandwidth of the thermal noise of the reset circuitry after the signal is applied.

11. The image sensor circuit of claim 9, wherein the control line is configured to extinguish the reset of the pixel circuit with thermal noise less than sqrt(kT/C).

12. The image sensor circuit claim 9, wherein the reset circuitry is configured to perform a hard-soft reset of the pixel circuit.

13. The image sensor circuit of claim 9, wherein the signal is configured to be applied after the reset circuitry is in a subthreshold mode.

14. The image sensor circuit of claim 9, wherein the signal is configured to be applied after the reset circuitry is in a soft reset mode.

15. The image sensor circuit of claim 9, wherein the reset circuitry is configured to reach the threshold level during a soft reset.

16. The image sensor circuit of claim 1, wherein a phase of the reset is offset from a corresponding phase of a reset for an adjacent pixel circuit.

17. The image sensor circuit of claim 1, further comprising circuitry for extinguishing the reset of the pixel circuit after the threshold level has not been reached if a termination condition has occurred.

18. The image sensor circuit of claim 17, wherein the termination condition includes elapsed time.

19. The image sensor circuit of claim 17, wherein the termination condition is based on completion of reset of one or more other pixel circuits.

20. The image sensor circuit of claim 1, wherein the pixel circuit is a three transistor (3T) pixel circuit.

21. The image sensor circuit of claim 1, wherein the noise reduction circuitry includes a comparator configured to compare the output of the read out circuitry to the threshold level during the reset of the pixel circuit.

22. The image sensor circuit of claim 1, wherein the noise reduction circuitry includes a current source configured to apply a signal to the control line after the threshold level is reached.

23. The image sensor circuit of claim 1, wherein the noise reduction circuitry is included in column circuitry of the image sensor.

24. The image sensor circuit of claim 1, wherein the noise reduction circuitry is to couple a current source or current drain to the column line after the threshold level is reached.

25. The image sensor circuit of claim 1, wherein the noise reduction circuitry includes a comparator and two transistors, wherein the output of the comparator is connected to one of the two transistors and an inverse of the output is connected to the other transistor.

26. The image sensor circuit of claim 25, wherein one of the two transistors in the noise reduction circuitry is connected to a source pull-down circuit and the other transistor in the column circuitry is connected to a source pull-up circuit.

27. The image sensor circuit of claim 25, wherein one of the two transistors in the noise reduction circuitry is coupled to a positive reference voltage (Vdd) and the other transistor in the noise reduction circuitry is coupled to a negative reference voltage (Vss) or ground.

28. A method of resetting a pixel circuit, the method comprising:
    monitoring an output of the pixel circuit during reset of the pixel circuit; and
    in response to the output of the pixel circuit, providing a signal over a column line to end the reset of the pixel circuit; and
    extinguishing the reset of the pixel circuit if a termination condition has occurred prior to the output reaching a threshold level.

29. The method of claim 28, wherein the signal comprises a voltage applied to the control line.

30. The method of claim 28, wherein the pixel circuit includes reset circuitry having thermal noise.

31. The method of claim 30, wherein the signal is applied using a circuit that has a bandwidth higher than a bandwidth of the thermal noise of the reset circuitry.

32. The method of claim 30, wherein the signal reduces the thermal noise sensed by the pixel circuit at the end of the reset to less than sqrt(kT/C).

33. The method of claim 28, wherein the reset is a hard-soft reset.

34. The method of claim 28, wherein the signal is applied during a subthreshold mode of the reset.

35. The method of claim 28, wherein the signal is applied after the output reaches a threshold level during a soft reset mode.

36. The method of claim 35, wherein the threshold level is reached during a soft reset mode.

37. The method of claim 28, wherein the reset is offset from a corresponding reset for an adjacent pixel circuit.

38. The method of claim 28, wherein the termination condition includes elapsed time.

39. The method of claim 28, wherein the termination condition is based on completion of reset of one or more other pixel circuits.

40. The method of claim 28, further comprising providing an adjustment to a read out of the pixel circuit after the termination condition occurs prior to the output of the pixel circuit reaching the threshold level.

41. The method of claim 28, wherein an adjustment to a read out of the pixel circuit is interpolated after the termination condition occurs prior to the output of the pixel circuit reaching the threshold level.

42. The method of claim 28, wherein the pixel circuit is a three transistor (3T) pixel circuit.

43. An image sensor circuit, comprising:
- a pixel circuit including read out circuitry, the read out circuitry including at least one control line, the read out circuitry being configured to be coupled to an output node during a reset of the pixel circuit;
- noise reduction circuitry configured to be coupled to the output node during the reset of the pixel circuit, the noise reduction circuitry being configured to apply a signal to the at least one control line of the read out circuitry based on a determination that the output of the read out circuitry reached a threshold level during the reset of the pixel circuit; and
- circuitry for extinguishing the reset of the pixel circuit after the threshold level has not been reached if a termination condition has occurred.

44. An image sensor circuit, comprising:
- a pixel circuit including read out circuitry, the read out circuitry including at least one control line, the read out circuitry being configured to be coupled to an output node during a reset of the pixel circuit; and
- noise reduction circuitry configured to be coupled to the output node during the reset of the pixel circuit, the noise reduction circuitry being configured to apply a signal to the control line of the read out circuitry based on a determination that the output of the read out circuitry reached a threshold level during the reset of the pixel circuit, the noise reduction circuitry including a comparator and two transistors, the output of the comparator being coupled to one of the two transistors and an inverse of the output being coupled to the other transistor.

* * * * *